July 21, 1970

H. FLEISSNER 3,521,378

COMBINATION DRYING AND TENTERING MACHINE

Filed June 9, 1969

Inventor:
HEINZ FLEISSNER

By: Craig, Antonelli, Stewart & Hill
ATTORNEYS

Inventor:
HEINZ FLEISSNER

July 21, 1970  H. FLEISSNER  3,521,378
COMBINATION DRYING AND TENTERING MACHINE
Filed June 9, 1969  7 Sheets-Sheet 5

Inventor:
HEINZ FLEISSNER
By Craig, Antonelli, Stewart & Hill
ATTORNEYS

July 21, 1970  H. FLEISSNER  3,521,378
COMBINATION DRYING AND TENTERING MACHINE
Filed June 9, 1969  7 Sheets-Sheet 7

Inventor:
HEINZ FLEISSNER
By Craig, Antonelli, Stewart & Hill
ATTORNEYS:

United States Patent Office  
3,521,378  
Patented July 21, 1970

3,521,378  
COMBINATION DRYING AND TENTERING MACHINE  
Heinz Fleissner, Egelsbach, near Frankfurt am Main, Germany, assignor to Fleissner G.m.b.H., Egelsbach, near Frankfurt am Main, Germany  
Continuation-in-part of application Ser. No. 654,728, July 20, 1967. This application June 9, 1969, Ser. No. 831,686  
Claims priority, application Germany, June 8, 1968, 1,760,604; June 22, 1968, 1,760,717; June 27, 1968, 1,760,751; Apr. 8, 1969, 1,917,757; May 9, 1969, 1,923,668  
Int. Cl. F26b 13/30; D06c 3/02  
U.S. Cl. 34—115  5 Claims

ABSTRACT OF THE DISCLOSURE

The present disclosure is directed to an apparatus for the treatment of materials which comprises a heat-insulated treatment chamber, a plurality of sieve drum means subjected to a suction draft rotatably disposed within said treatment chamber, fan means associated with the sieve drum means for producing a suction draft and for circulating the treatment medium in said treatment chamber, heating means provided in the circulation zone of the treatment medium, tentering means containing tensioning chains at least partially disposed outside of the treatment chamber as inlet means, said tentering means cooperating with the sieve drum means for the effective conveyance of the material being treated to said sieve drum means, a supporting means disposed below the tensioning chains for supporting the material disposed on said chains and outlet means for removing the material being treated from the treatment chamber.

BACKGROUND OF THE INVENTION

The present invention is a continuation-in-part application of application Ser. No. 654,728, filed July 20, 1967.

The present invention relates to a process and apparatus for the treatment, e.g. drying, steaming, fixing, condensing and the like, of materials, particularly textile materials, such as cloth, knit fabrics, composite fiber materials, tufted goods, etc., by utilizing a gaseous treatment medium, for example, air, steam, or steam-air mixtures. The apparatus of the present invention includes a heat-insulated housing containing as the conveying means at least one sieve means subjected to a suction draft, preferably a perforated sieve drum means, and one or more fan means for the generation of said suction draft and for the purposes of circulating the treatment medium. A heating means is also provided for heating the treatment medium.

It is known to combine devices of this type with a tentering device in such a manner that the material is guided, while being stretched along its width, directly up to the placement or transfer of said material to the conveying means subjected to a suction draft. Such a guidance of the material preliminary to its introduction onto a conveying means subjected to a suction draft exhibits the advantage that the width of the wide-stretched material is substantially retained by the suction draft and thus is prevented from shrinking.

The utilization of the throughflow principle and the conveyance on perforated sieve conveying means during the treatment affords considerable advantages as compared to a sole tenter frame treatment. The particular advantages of the throughflow principle include extremely brief treatment times and an exteremely uniform treatment effect. By placing the material on sieve means during the treatment process, a more uniform character of the materials is obtained, particularly in the case of fixing treatments and generally in the case of treating mesh material. By the utilization of a tentering station, the material can be prestretched to a specific width. Furthermore, spin folds (creases) can also be substantially eliminated, and a good shrinkage of the material can be achieved, for example, by steaming of the material in the tentering zone.

One of the problems encountered in the use of tentering devices is that the material sags between the tentering chains. This can promote the formation of arcs in case of treating very wide webs of material tending toward arc formation. Also, the tensile forces are correspondingly high when treating wet textile material, especially in the case of thick goods such as tufted rugs and stitched felts. In the case of wide webs of material, it is very difficult to fully eliminate oblique distortion and arcs solely by the chains of the tenter station, that is, by temporarily having one chain lead or lag behind with respect to the other chain. Also, in the case of sensitive knit fabric webs having a width of about 3 m. and more, a sagging of the material is disadvantageous since as a result, the loops or stitches in the marginal zones are stretched out of shape more readily and to a greater degree than those in the central zone.

In connection with tentering stations, it is conventional to dispose cords or pipes between the tentering chains, on which elements the material rests and thus is prevented from sagging. However, such an arrangement of stationary supporting units is undesirable since the material slides along these stationary elements and thus is braked. The disadvantage of arc formation as a consequence of structural changes in the marginal zone also occurs in this arrangement and even to an increased extent.

In order to eliminate the spin creases, and in order to stretch the material to a specific width, a certain length of the tentering station is required, for example, at least about 4 m. or more. The longer the tentering station, the more favorably affected is the material. However, lengthening the tentering station is expenssive and in addition produces the disadvantage that the space requirements become correspondingly larger. In general, only a limited space is available for such treatment plants. Therefore, it is desired to keep the plant as short in length as possible. By employing the perforated drum principle, a shortening of the treatment time and thus also a shortening of the length of the treatment plant can be achieved, However, in the case of treating various materials which tend to shrink substantially in fiber fixing processes, the suction draft of the perforated drum alone is insufficient for preventing these materials from shrinking in their width. For example, fabrics and textile webs of polypropylene exhibit a higher shrinking capacity. Thus, it is advantageous for textile webs which tend to shrink greatly to be heated to the treatment temperature while they are still held in the tentering chains of the tentering zone, that is, before they are freely guided onto the surfaces of perforated sieve drums subjected to a suction draft.

SUMMARY OF THE INVENTION

The object of the present invention is to avoid the prior art disadvantages in the treatment of textile materials.

Another object of the present invention is to provide an improved process for the treatment of textile materials wherein the material being treated is guided through the treatment process and apparatus in a distortion-free manner.

A further object of the present invention is to provide an improved process and apparatus for the treatment of textile materials wherein a substantial reduction in apparatus cost and space can be achieved thereby making the present system economically advantageous.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the treatment of textile materials may be obtained by providing at least one endless supporting element associated with the tentering device, which travels along with said tentering device. The supporting elements, according to one embodiment of the present invention, can consist of cords or strings (bands or belt) spaced at mutual distances from each other. In this connection, it is advantageous to arrange the cords and strings on the side carrying the material, and at a slight angle with respect to each other in the direction of travel, in such a manner that the strings preferably diverge from one another, as seen in the direction of travel. Another desirable arrangement results by disposing a broad supporting band between the tentering chains. In this connection, the supporting band (belt) is arranged at the level of the tentering plane or slightly therebelow.

Another favorable possibility resides in disposing the tentering chains above the supporting element thereby guiding the web of material along the underside of said tentering chains. This arrangement exhibits the particular advantage that the supporting element, for example the supporting band can be provided wider than the tentering width, so that the entire width of the material can rest on the supporting element. The arrangement of supporting elements affords the further advantage that said elements can be additionally conducted, at least partially, above a perforated drum, and thus the material being treated is held between the perforated drum and the supporting elements during the heating-up procedure. Accordingly, the material is prevented from shrinking in its width due to an even greater extent than already effected by the suction draft exerted by the drum. In order to remove the web of material from the needles (pins) of the supporting element, a conventional perforated roll, which is under a suction draft, can be employed. This ensures that the material is unequivocally held by a suction draft along its peripheral edges, even along the path between the transfer area and the conveyance onto the perforated drum.

The provision of using a supporting element between the tentering chains exhibits the additional advantage that said element can temporarily be driven faster or more slowly by the interposition of an appropriate gear, and thus can be employed to compensate for arc distortions of the material.

The use of a supporting element, particularly a band-shaped supporting element, makes it additionally possible, according to the present invention, to utilize the apparatus in a substantially more versatile manner. Thus, it is possible to employ the present apparatus for treating tubular, band-shaped or diagonally disposed materials, as well as for fluffy goods and for multi-web operation, if the supporting element is arranged and correspondingly constructured to order to serve as the inlet for these materials. Apparatus with versatile application is of great importance, particularly with small companies and in the case of contractors, since in such cases, due to the large capacity of the perforated drum devices, all existing types of materials can be treated thereon.

In accordance with a further embodiment of the present invention, the supporting element consists of a cushion of a gaseous medium. For this purpose, it is suggested to provide the apparatus with a blower and with the appropriate guiding elements which make it possible to form a cushion of air, steam or an air-steam mixture below the material being treated, or to expose the material from below to a gaseous medium. Since materials having substantially varying weights are treated on such plants, it is necessary to adjust the air cushion which carries the material accordingly. This can be done in an effective manner by providing a regulating or adjusting unit on the air-producing element, thereby making it possible to vary the amount of the medium to which the material is exposed.

In order to produce a suction draft, a blower is provided at the perforated drum where the material is removed from the pins or needles of the tentering device. In a further feature of the present invention, it is proposed to employ the air drawn from the perforated sieve drum for treating the material in the tentering section, that is to provide a common blower for the transfer drum and for the tentering device. The blower can be disposed on the front end of the transfer drum, where the material is removed from the pins, and appropriate conduit means are arranged beneath the tentering device, said conduit means directing the air drawn from the perforated transfer drum against the underside of the material disposed on the tentering device.

However, it is more advantageous to dispose the blower beneath the tentering device and to extend a suction line to the perforated inlet drum, since sufficient space is available for this purpose. The blower can also be provided in the housing of the apparatus, beneath the first perforated drum, that is, in the housing on the front end and at the inlet of the apparatus. Since the material is guided on the upper surface of the first perforated sieve drum means, the air circulated in the dryer is not disturbed by the arrangement of the blower beneath the perforated drum. When disposing the blower in the housing or beneath the tentering device or tentering station, it is also possible to extend to suction lines to the perforated transfer drum and exert a suction on said drum from both sides which results in an uniform suction effect.

In order to regulate the air stream, it is advantageous to provide nozzles, preferably adjustable nozzles, for example slotted nozzles, at the tentering station beneath the material being treated. The effective width of the nozzles should correspond to the respective tenter widths. In order to achieve this result, it is suggested to make the effective width of the nozzles adjustable, and to effect the adjustment of the nozzles preferably together with the adjustment of the tentering chains to the respective tenter width.

According to another embodiment of the present invention, a particularly compact structure can be obtained by extending the tentering elements of the tentering station and/or the perforated band above or below all perforated drums to the rearmost perforated drum, so that these elements and/or the band transfer the material onto this drum before they run over the ends of the perforated drum. In this connection, it is advantageous in many cases to provide the rearmost perforated drum with a larger diameter than the other perforated drums, since in this case the tentering elements and/or the perforated band, can be guided at least around the rearmost perforated drum. However, it is also possible to extend the tentering elements and/or the perforated band above or below the housing to a point in close proximity to the rearmost perforated sieve drum. However, in many cases it is more advantageous to extend the tentering elements and/or the perforated band in the housing up to the last perforated sieve drum, since it is thereby possible to pretreat the materials while it is simultaneously being conveyed on the tentering chains and/or on the perforated band.

In case such devices are to be incorporated into a continuous plant, it is advantageous to associate a further conveying element, for example, at least one additional perforated band and/or tentering element with the perforated drums. This is done by providing said additional conveying element on the opposite side from the tentering station and/or the perforated band serving as the inlet. This produces in the treatment chamber a meander-shaped or S-shaped path of the material, the material inlet and the material outlet being disposed at opposite ends of the apparatus. This space-saving construction is also desirable for treating materials which do not shrink during the treatment process. For such goods, the conveying elements of the inlet can be disposed above the perforated drum in such a manner that the material arrives at the receiving perforated drum by free fall, and the additional conveying elements disposed beneath the perforated drums are arranged in such a manner that the material arrives by free fall from the delivering perforated drum to these conveying elements, represented, for example, by a perforated band. Such an arrangement exhibits the advantage that all of the drums have the same diameter and the material travels automatically through the treatment chamber even at the commencement of the operation of the plant.

For various materials, such as for example, nap material, the combination of several drums over which the material is alternately conveyed is disadvantageous since the nap is thereby compressed. Also, it was discovered that during the transfer from one drum to another drum, where the material is not held by a suction draft, said material can experience shrinking in its width. This danger is present particularly when the material is under a tensile stress during the transfer, perhaps due to a faulty adjustment of the speeds of the various drums. Accordingly, it is further suggested to provide a device having only one perforated sieve drum, to arrange the tentering station beneath this perfroated drum, to transfer the material being treated at that point directly to the perforated drum and to arrange the inlet and outlet means in this device on one side of the apparatus and preferably one above the other so that the perforated drum is substantially encompassed by the material. By substantially encompassing the perforated drum by the material being treated, said material spends approximately the same time within the treatment chamber as in the otherwise customary two-drum devices wherein the material is alternately guided around one-half of each drum. Furthermore, because only unilateral contact of the material being treated with the sieve drum is effected, it is possible to treat nap goods on this device in a flawless manner. Furthermore, the apparatus exhibits a relatively short structural length.

If the apparatus is also to be used for fixing processes, then a cooling unit is generally additionally required, said cooling unit quenching the material after the fixing treatment. Accordingly, it is suggested to dispose a cooling unit, preferably a perforated drum subjected to a suction draft, above the tentering station.

In order to obtain a flawless guidance of the material during removal from the perforated drum disposed in the treatment chamber, it is proposed to arranged at least one outlet roll at the exit of the device. From this roll, the material being treated can then be conveyed to the cooling unit. It is also advantageous to provide this roll at the outlet as a perforated roll. Thus, it is possible to take in the air drawn in by the device at the outlet through the roll and through the material guided on said roll, and thus precool the material and simultaneously preheat the drawn-in fresh air. This provides a very economical mode of operation.

In place of a roll, a trough-shaped chute can also be associated with the perforated sieve drum at the outlet of the apparatus. A chute is recommended especially when a complete stress-free treatment is desired, and in the case of treating nap goods. It is advantageous to mount the chute so that it is pivotable or capable of being folded in the upward direction. Thus, the point where the material is transferred onto the pins, and the perforated drum remain readily accessible.

In the case of woven and knitted materials, for example polyamide, which are to be stretched in their widths during the treatment, and which tend to shrink during the heat-treatment, it is advantageous to heat these materials to a substantial extent in the tentering station where they are held in the tentering chains. For this purpose, it is suggested to provide the tentering station at the entrance to the treatment chamber with a seal which can preferably be adjusted in its breadth, and to conduct, in the treatment chamber, a partial stream of the circulated treatment medium, for example, air and/or steam, against the bottom of the material being guided in the tentering station.

In order to prevent light-weight textile materials from being blown upwardly by the circulating treatment medium, it is proposed to hold the material, after it has been conveyed over the perforated drums, between two perforated bands and thus conduct the material through the circulating treatment medium in the housing, at least up to the outlet of the apparatus.

Devices having perforated drums subjected to a suction draft for the drying or steaming of loose fibrous material, combed yarn, several tricot hoses disposed side-by-side, or several fabric webs disposed side-by-side, are well known. In accordance with a further embodiment of the present invention, the present apparatus can be selectively employed for the treatment of web-type or loose materials. This can be accomplished with the apparatus described hereinabove by providing an additional inlet means for the material which is associated with the sieve means subjected to a suction draft, preferably a perforated sieve drum means, which takes over the web of material from the tentering station, this inlet means being disposed at another location, preferably at a higher or lower point. This second material inlet means can be provided with at least one roll if it is intended for feeding solely web or diagonally disposed materials. In this connection, the roll is directly associated with the subsequent perforated drum. However, if it is desired to also treat loose fibrous material on this device, then the second material inlet means should be provided with a conveyor belt. This conveyor belt can be associated with a roll disposed thereabove, for sealing purposes. It is advantageous to make the conveyor belt longer than the tentering station or to have the conveyor belt extend beyond said station so that the loose fibrous material can be placed on the conveyor belt by a conventional device, for example a box feeder (hopper feeder), as a uniform fleece and can be transferred to the perforated drum dryer.

In order to prevent the operating personnel from being hampered by the conveyor belt, which is preferably disposed above the tentering station, when the tentering station is to be operated, it is suggested to mount the conveyor belt so that it is pivotable and to provide the pivot axis preferably at the second inlet for the material. Thus, it is possible to pivot the conveyor belt a certain amount in the upward direction.

A very space-saving solution can also be obtained by providing a platform above the tentering station, on which platform the material feeder or the materials can be placed together with additional units such as a hopper feeder, and/or a foulard, and the like, when working with the second material inlet.

In order to obtain optimum efficiency on the first perforated drum in connection with both inlets for the material being treated, it is suggested to associate a cover with the sieve drum subjected to a suction draft. This cover selectively shields the zone between the first and second material inlets from the suction draft or alternatively releases the suction draft in this zone. The cover can be disposed on the inside of the perforated sieve drum and can be pivotably mounted. However, it is also possible to produce such a cover from two perforated or slotted metal sheets, at least one of which is displacable with respect to the other to such an extent that the perforations of the two metal sheets coincide or are offset with respect to each other. These metal sheets can be provided within the perforated drum as well as on the outside of said drum. In general, said metal sheets are adapted to the curvature of the perforated drum.

By means of the above-mentioned features, an apparatus is obtained which can be utilized in a very versatile manner. Such a versatility is extremely important for smaller firms and for companies which must be able to treat all types of materials encountered on such an apparatus in order to be able to fully utilize the large capacity of a perforated drum plant.

BRIEF DESCRPTION OF THE DRAWINGS

The present invention will become more fully understood from the detailed description given hereinbelow on the accompanying drawings which are given by way of illustration only and thus are not limitative of the present invention and would therein.

DESCRIPTION OF THE PREFERRED EMBODIMENTS

Figure 1:
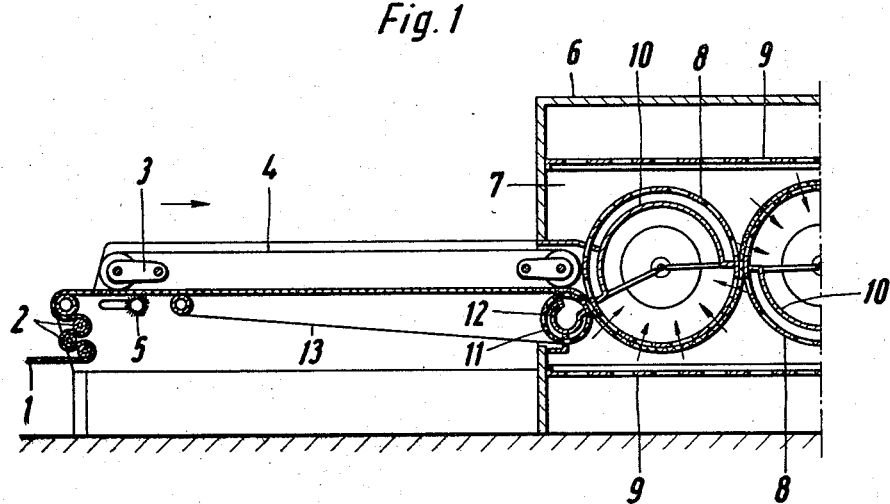
FIG. 1 shows a perforated sieve drum device in a longitudinal sectional view provided with a tentering station disposed in front of said device.

Referring now the drawings wherein like reference numerals are used throughout the various views to designate like parts the apparatus according to FIG. 1 comprises a web-shaped material 1 which is conducted over rollers 2 and spread during said process. Subsequently, the material is transferred to a tentering station 3 and taken over by the tentering chains 4. In the illustrated embodiments, the tentering chains are constructed as pins, spikes or needle chains having a vertical chain return system. However, it is also possible to employ tentering chains having a horizontal chain return. The material 1 is attached to the pins in a conventional manner by means of circular brushes (brush disks) 5. The apparatus includes a heat-insulated housing 6 subdivided by a longitudinal wall 7 into a treatment chamber and a fan chamber, which is customary in perforated sieve drum dryers. Perforated drums 8, which are subjected to a suction draft are disposed in the treatment chamber. In the fan chamber, the fans (not shown) are accommodated, said fans being required for the production of the suction draft. These fans below the treatment medium drawn from the perforated drums 8, via heating units (not shown) above and below the perforated drums back into the treatment chamber. The longitudinal wall 7 accordingly extends only up to the perforated covers 9 disposed above and beneath the perforated drums for making the flow uniform. On the side which is free of the material being treated, the perforated drum contains a cover or baffle member 10 which interrupts the suction draft at this side of the sieve drum.

A suction roll 11 is disposed at the inlet of the housing 6 in order to transfer the material from the tentering chains 4 to the first perforated drum 8. This roll, too, is shielded from the suction draft on the side free from contact with the material being treated by means of a cover plate 12.

Figure 2:
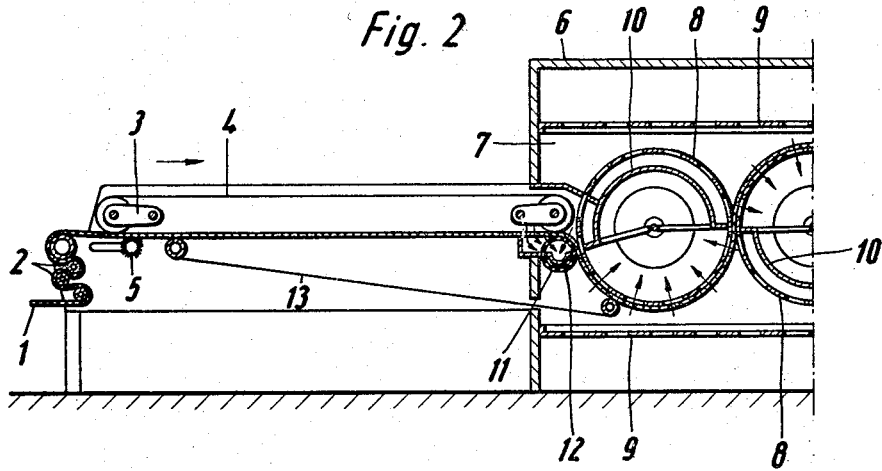
FIG. 2 shows another embodiment of the device shown in FIG. 1.

In the apparatus according to FIGS. 1 and 2, the material 1 is guided on the underside of the tentering chains 4 by a conveyor belt 13 which is associated with the tentering chains. Thus, the material being treated rests on this conveyor belt. The conveyor belt in these embodiments extends beyond the maximum stretching width.

In FIG. 1, there is provided a suction roll 11 for guiding and simultaneously for removing the material from the pins of the tentering chains 4 to the first perforated drum 8. Also, in this suction roll the side free of material being treated is shielded from the suction draft by a cover plate 12.

The device according to FIG. 2 is similarly constructed to the device of FIG. 1. However, in FIG. 2, the conveyor belt 13 partially extends about the first perforated drum 8, so that for a short distance the material is held between conveyor belt 13 and perforated drum 8 during the heating procedure. Both embodiments of FIG. 1 and FIG. 2 exhibit the advantage that it is possible with these devices to feed several tubes or obliquely distributed material, even loose fibrous material, to the perforated drums and thus treat such material.

Figure 3:
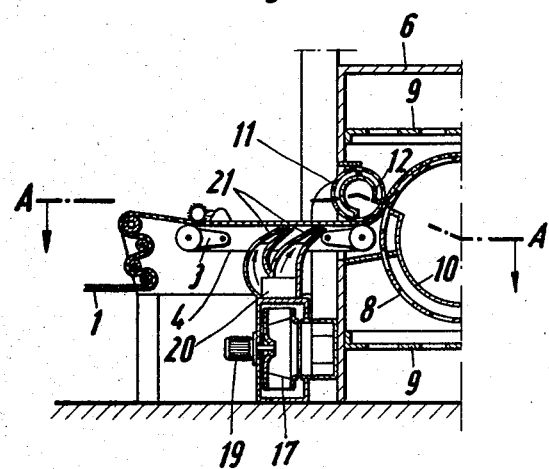
FIG. 3 shows the feature wherein the material being conveyed on the tentering station is provided with a cushion on the treatment medium.
Figure 4:
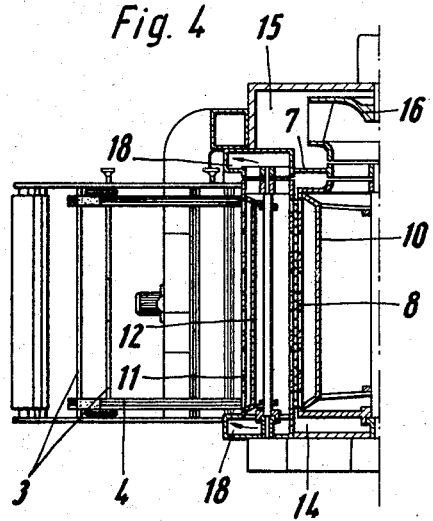
FIG. 4 shows the device of FIG. 3 along the section line A—A.

In the embodiment according to FIGS. 3 and 4, a blower 17 is provided underneath the tentering station. This blower draws the air out of the perforated drum 8 from both front faces, by way of suction ducts 18, and blows this air, in turn, through conduit 20 and nozzles 21, against the web of material 1. This air stream prevents sagging of the material and ensures a gentle treatment thereof. In place of air, it is also possible to provide steam, or a stream-air mixture. The blower motors are denoted by 19.

The present invention can also be utilized in a device wherein the tentering station terminates close and below the first perforated drum. In this device, the material is directly transferred from the tentering station to the perforated drum. In this connection, the material can be removed from the pins either solely by the suction draft of the perforated drum, or by means of additionally provided, stationary or rotating elements, e.g., lifting or transfer elements.

In the embodiment where the tentering station extends to an appreciable extent into the housing and thus into the treatment chamber, a portion of the air drawn by the fan 16 from the perforated drum 8 can now be blown against the material underneath the tentering station in the housing. The exhibits the advantage that in addition to providing that the material being treated is carried on a cushion of air, the material is also exposed to heating and optionally prefixing within the tentering stage.

Figure 5:
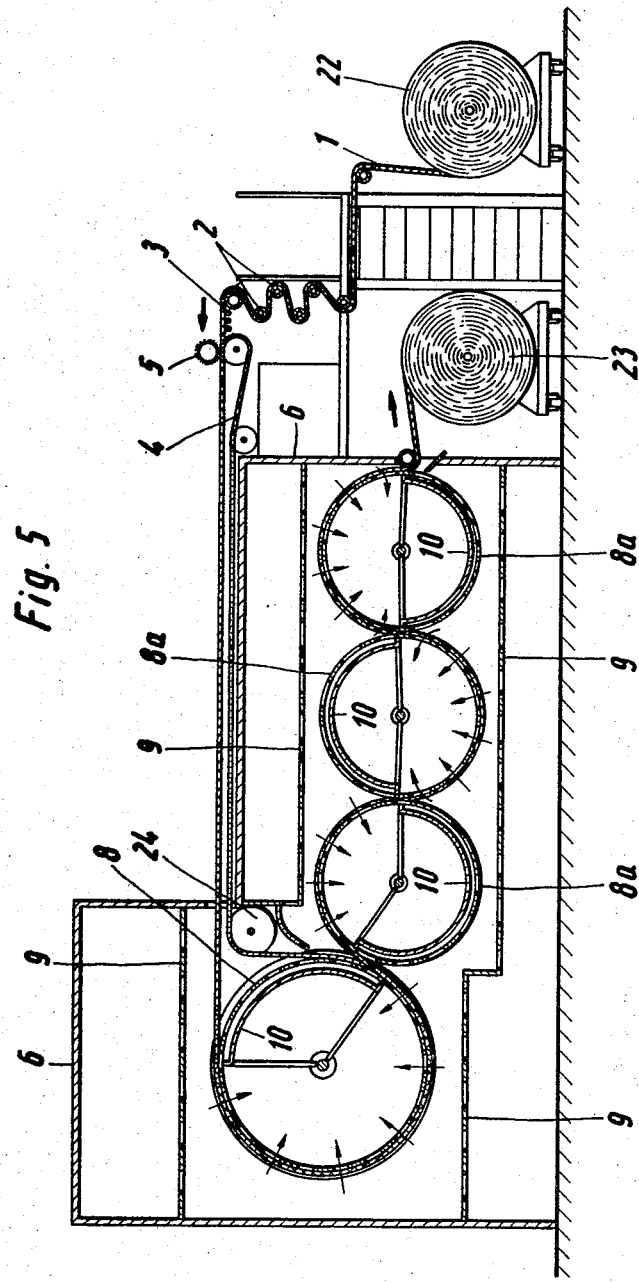
FIGS. 5 to 8 show various possible combinations of the perforated sieve drum means with the tentering station.

In the apparatus of FIG. 5, a web-shaped material 1 is pulled off a mandrel 22 and guided with spreader rolls 2 to the inlet of a tentering station 3, where it is attached to the pin chains 4 by way of brush rollers 5. The tentering chains 4 move above the treatment chamber to the rear portion of the heat-insulated housing 6 and are, at that point, passed around a perforated drum 8 subjected to a suction draft. The material 1 held in the tentering chains rests on the perforated drum 8. The material 1 is heated to the treatment temperature by the suction draft before it is passed on to the additional perforated drums 8a, which contain a substantially smaller diameter than the perforated drum 8. During the transfer from drum 8 to the perforated drums 8a, the textile web is removed from the pins of the tentering chains. The tentering chains 4 are returned to the inlet of the apparatus above the housing 6 surrounding the small perforated drums 8a by way of return guide deflection wheels 24. The material 1 is alternately conveyed over the individual perforated drums 8a, so that it passes over and under said drums respectively. The portion of the perforated drum which is not covered by the material 1 being treated is shielded from the suction draft by a conventional cover plate 10. Outside of the housing 6, a reeling-up device 23 is provided for winding up the material 1 on a mandrel. Outside of the housing 6, a cooling drum 25 can additionally be provided, as shown in FIG. 6, before the material 1 is reeled up.

Figure 6:
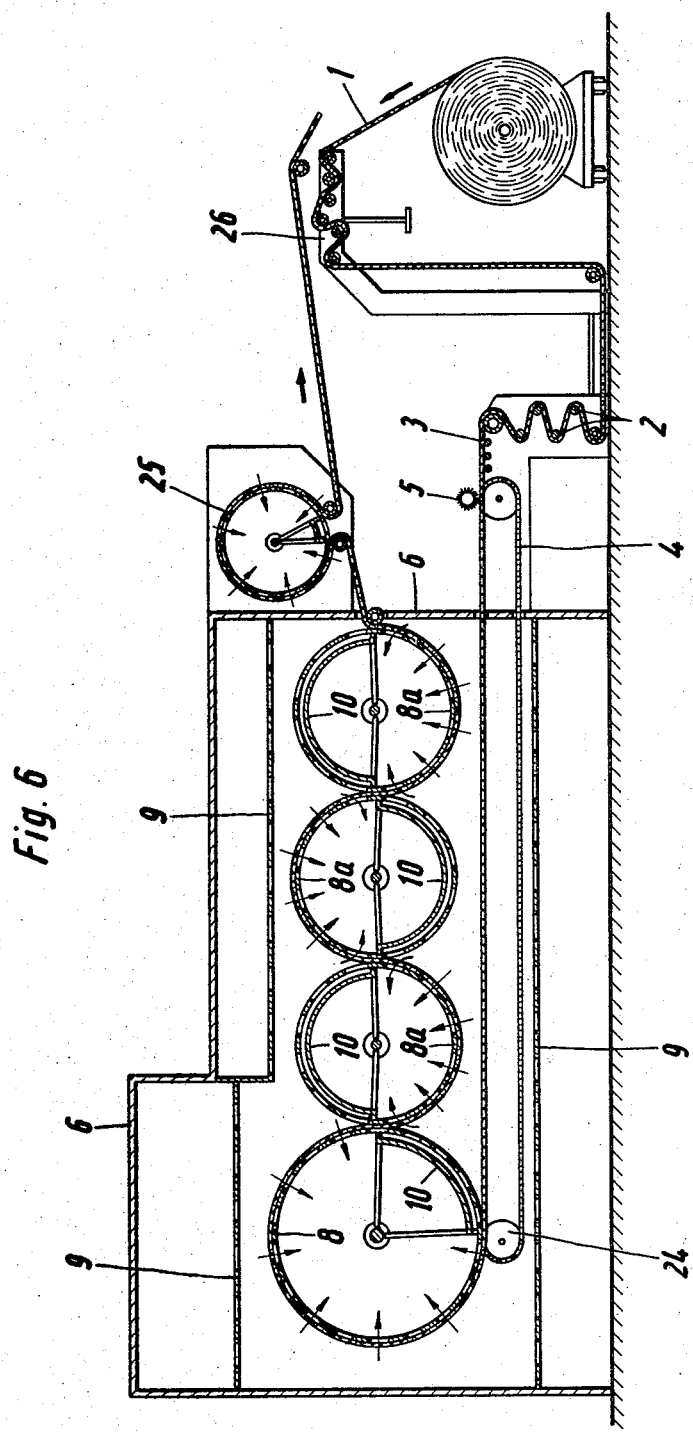

The device of FIG. 6, is similar in its construction to the device of FIG. 5. The material 1 is conducted to the tentering chains 4 by way of a frame member 26. The tentering chains 4, in this embodiment, convey the material 1 through the treatment chamber to the large perforated drum 8, where the material 1 is pulled from the pins of the tentering chains 4 by the suction draft of the perforated drum 8. During the time when the material is guided on the tentering chains in the treatment chamber, it is generally already heated to the treatment temperature, so that in this case the tentering chains 4 hold the material by its width during the heating process. A subsequent shrinkage on the perforated drums is thus also avoided in this embodiment. In order to render the air flow uniform, screen covers or sieve sheets 9 are provided above and beneath the perforated sieve drums.

Figure 7:
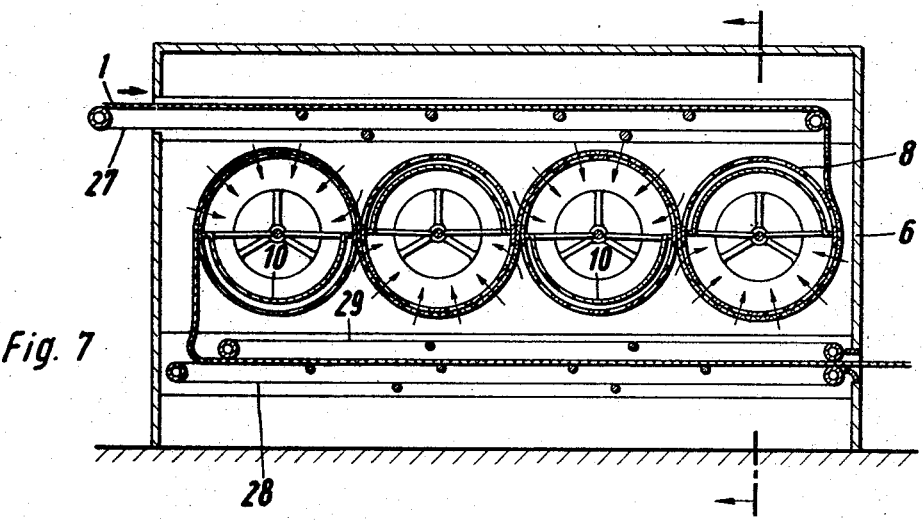

The device of FIG. 7 is intended for the treatment of materials, which during the treatment process to which they are subjected, do not shrink at all, or only to a minor extent. For this reason, no tentering device is provided, but rather only an inlet belt 27 which is perforated. The material 1 passes from the perforated inlet belt by free fall onto the perforated drums 8 disposed therebelow, and from there, again by free fall, to a further perforated belt 28, which is associated with another perforated belt 29 as the cover belt therefor. Thus, the material 1 is conveyed to the outlet by being guided between the perforated belts 28 and 29 beneath the perforated sieve drums.

Figure 9:
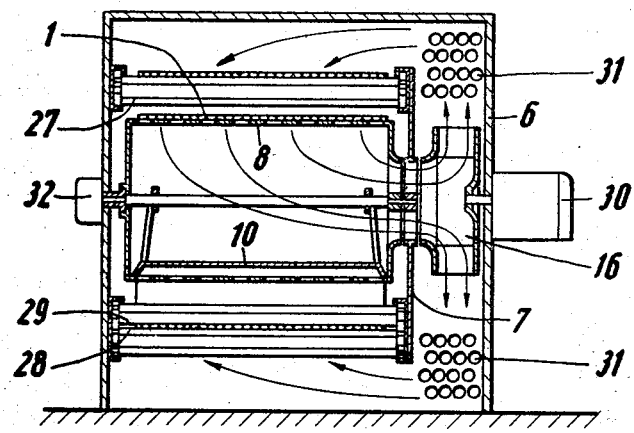
FIG. 9 shows a cross sectional view through the device of FIG. 7.

The cross section of this device is illustrated in FIG. 9. As can be seen therefrom, the internal space of the heat-insulated housing 6 is subdivided by a wall 7 into a heating chamber and a treatment chamber. Each perforated drum 8 is associated with a radial-flow fan 16, disposed at the front end of the drum. The drive 30 for the fan is attached at the outside of housing 6. Heating units 31 are provided in the fan chamber above and below the fan 16. The drive 32 for the perforated drum 8 is mounted on the other side of the housing.

Figure 8:
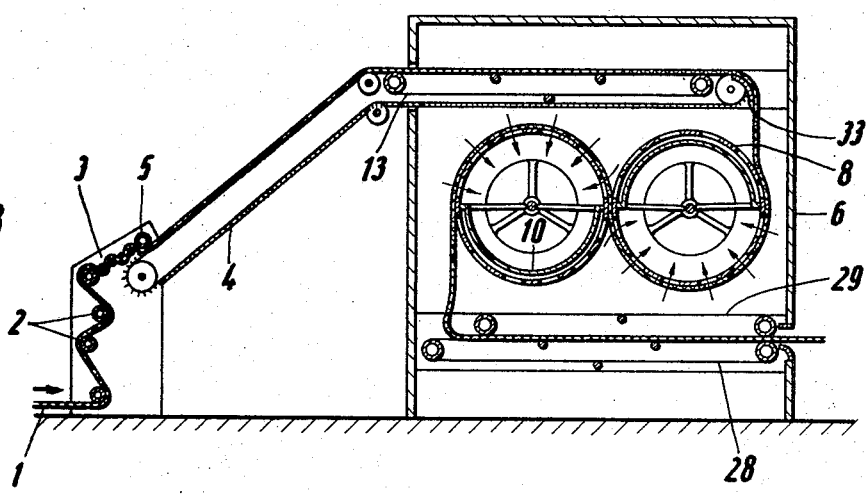

The device of FIG. 8 is similarly constructed as the device of FIG. 7, with the exception that in this embodiment, the tentering chains 4 are provided in place of an inlet belt 27. A supporting belt 13 is associated with these chains in the treatment chamber. By means of unpinning transfer elements 33, the textile web 1 is removed from the pins in the reversing zone of the tentering chains 4 and passes, in free fall, onto a perforated drum 8. The subsequent traver of the material corresponds exactly to that of FIG. 7.

Figure 10:
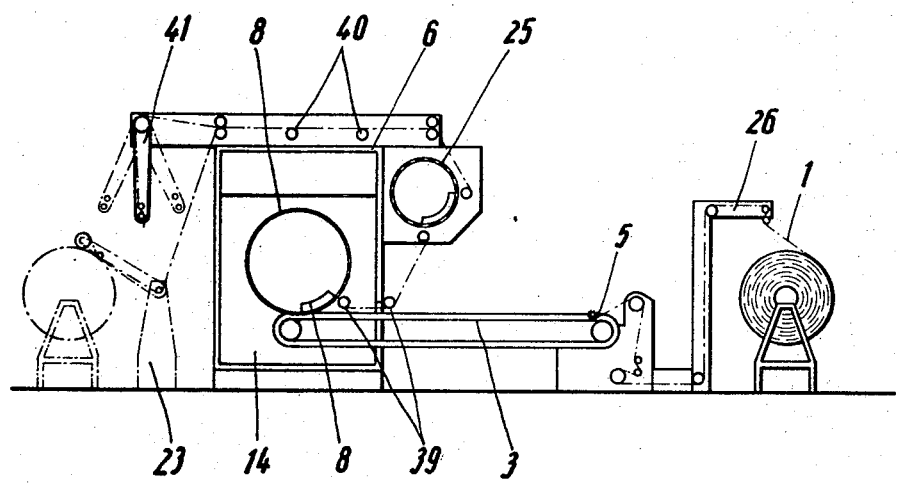
FIGS. 10 and 11 show further embodiments of the apparatus of the present invention.

In the device of FIG. 10, a web-shaped material 1 is conducted over an inlet frame 26 to brush roller 5, for attaching the material to the needles of a tentering device 3. The tentering device 3 extends into a treatment chamber 14 and partially beneath a perforated drum 8. By means of the suction draft of the perforated drum 8, the material 1 is lifted off the pins of the tentering device 3 and guided on the perforated drum 8 during the further treatment. The inlet and outlet in this apparatus are disposed one above the other in close proximity. At the outlet, rolls 39 are provided for guiding the material 1. The portion of the perforated drum 8 which is not covered by the material 1 being treated is shielded, in a conventional manner, from the suction draft by means of a cover plate 10. Above the tentering device 3, on the outside of the housing 6 of the device, a cooling drum 25 is provided. Subsequently, the material 1 passes via rolls 40 to a winding-up (baler) device 41 or to a coiling (reeling-up) device 23. The winding-up device 41 and the reeling-up device 23 can also be provided at the inlet of the device. In such an arrangement, the material is conducted from a cooling drum 25 via the tentering device 3 and a frame 26 to the baler 41 or from the reeling-up device 23 in front of said baler. This embodiment is shown in FIG. 11.

Figure 11:
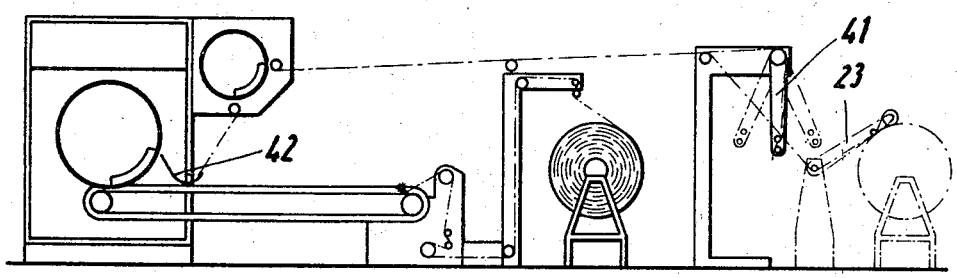

The construction of the apparatus according to FIG. 11 essentially corresponds to the device of FIG. 10, except that, in place of rolls 39, a chute 42 is disposed at the outlet, said chute being mounted to be pivotable or foldable in the upwardly direction. This embodiment, in addition to providing a completely tensionless operation, exhibits the advantage that the material during the start-up of the device automatically exits the treatment chamber.

Figure 12:
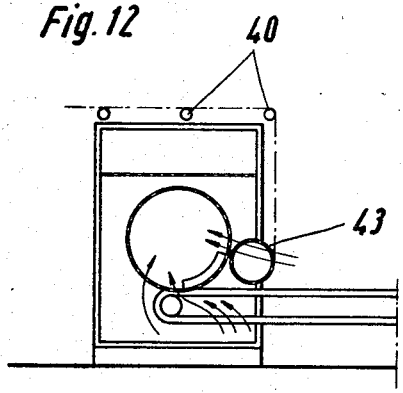
FIG. 12 shows a variation of the embodiments of FIGS. 10 and 11.

The apparatus of FIG. 12, with respect to the construction thereof, substantially corresponds to the apparatus of FIG. 10, except that a perforated roll 43 is provided at the outlet of the treatment chamber. By means of this perforated roll 43, the fresh air is drawn into the treatment chamber of the device and thus passes twice through the material exiting from the treatment chamber.

In case of thinner, very permeable materials, this perforated roll 43 is generally sufficient for cooling the material satisfactorily, so that it is possible to omit the use of a special cooling roll 25, as in the devices of FIGS. 10 and 11. Since, in the illustrated embodiments, the tentering station is sealed at the inlet into the treatment chamber 6, it is possible, for example, in a bilaterally blowing radial-flow fan, for the air returning in the downward direction into the treatment chamber to flow up against the material 1 held in the tentering station 3 and thus heat said material during this procedure to a substantial extent. Since materials containing synthetic fibers tend to shrink during the heating step, or during the fixing process, this measure makes it possible to substantially prevent the shrinking of the material, even in cases where there is a more extensive stretching of the material in the width.

Figure 13:
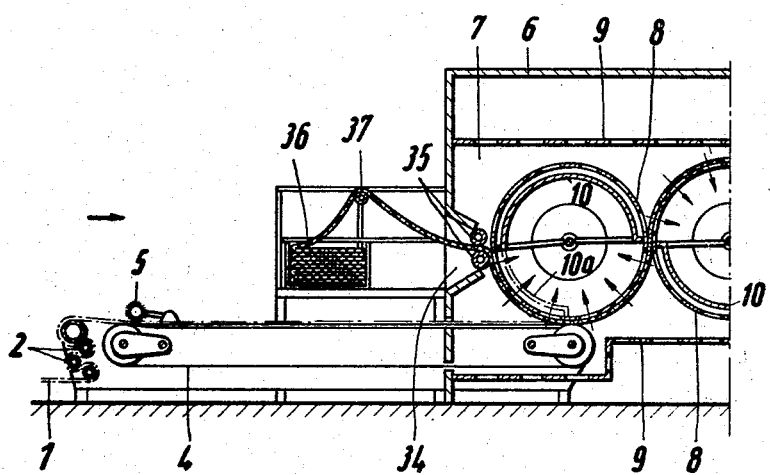
FIGS. 13 and 14 show the inlet portion of the apparatus of the present invention wherein the tentering means and the material to be treated are separately introduced into the treatment chamber.
Figure 14:
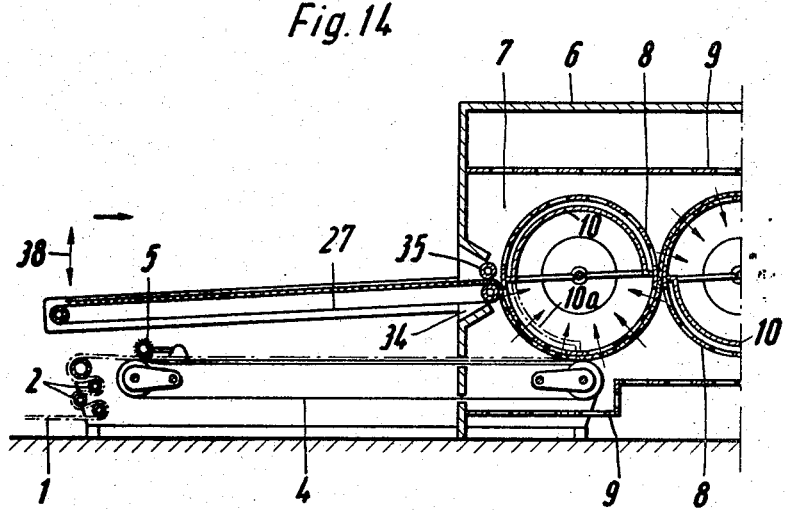

The two devices of FIGS. 13 and 14 possess a second material inlet 34. This inlet, in the device of FIG. 13, consists of a pair of rolls 35. In this device, tubular material 36 is provided in the folded condition on a pedestal, said tubular material 36 being withdrawn by means of a roll 37.

In the device of FIG. 14, the second material inlet 34 is provided with a conveyor belt 27 which, as indicated by the arrow 38, can be pivoted in the upward direction. A pair of rolls 35 is associated with the conveyor belt 27 at the inlet 34 for sealing purposes. By way of the conveyor belt 27, tubular and diagonal-type material, as well as loose fibrous material can be fed to the first perforated drum 8. The area between the point of transfer of the material from the tentering chains 4 and the second inlet can be selectively exposed to a suction draft or shielded from a suction draft by means of a pivotably mounted cover member 10a.

The invention being thus described, it will be obvious that the same may be varied in many ways. Such variations are not to be regarded as a departure from the spirit and scope of the invention, and all such modifications as would be apparent to one skilled in the art are intended to be included.

The claims herein are directed to the species of FIG. 5.

What is claimed:

1. An apparatus for the treatment of materials which comprises a heat-insulated treatment chamber, a plurality of sieve drum means subjected to a suction draft rotatably disposed within said treatment chamber, the first sieve drum means having a substantially larger diameter than the subsequent sieve drum means, fan means associated with the sieve drum means for producing a suction draft and for circulating the treatment medium in said treatment chamber, heating means provided in the circulation zone of the treatment medium, tentering means containing tensioning chains disposed above a portion of the treatment chamber, the tensioning chains being passed around the first sieve drum means and returned above said treatment chamber, inlet means for introducing the material to be treating to the tentering means and outlet means for removing the material from the treatment chamber.

2. The apparatus of claim 1, wherein the inlet means include a mandrel associated with spread rolls.

3. The apparatus of claim 2, wherein brush rollers are associated with the tentering means for attaching the material being treated to the tensioning chains.

4. The apparatus of claim 1, wherein a return guide deflection wheel is provided near the first sieve drum to accommodate the tensioning chains.

5. The apparatus of claim 4, wherein the outlet means is a reeling-up device.

References Cited

UNITED STATES PATENTS

| 1,492,480 | 4/1924 | Robertson | 26—60 |
| 2,343,351 | 3/1944 | Wedler. | |
| 2,473,404 | 6/1949 | Young. | |
| 2,081,461 | 5/1937 | McCann | 26—60 |
| 3,021,607 | 2/1962 | Fleissner | 34—115 |

MARK M. NEWMAN, Primary Examiner

A. D. HERRMANN, Assistant Examiner

U.S. Cl. X.R.

26—60; 34—158